United States Patent
Krauss

(10) Patent No.: US 7,793,982 B2
(45) Date of Patent: Sep. 14, 2010

(54) DEVICE FOR TIGHTENING A SEAT BELT

(75) Inventor: Walter Krauss, Berg (DE)

(73) Assignee: Key Safety Systems, Inc, Sterling Heights, MI (US)

( * ) Notice: Subject to any disclaimer, the term of this patent is extended or adjusted under 35 U.S.C. 154(b) by 250 days.

(21) Appl. No.: 12/170,548

(22) Filed: Jul. 10, 2008

(65) Prior Publication Data
US 2009/0039634 A1 Feb. 12, 2009

(30) Foreign Application Priority Data
Aug. 8, 2007 (DE) .................. 10 2007 037 314

(51) Int. Cl.
B60R 22/46 (2006.01)
(52) U.S. Cl. .................. 280/806; 297/478; 297/480
(58) Field of Classification Search .............. 280/806, 280/807; 297/478, 480; 180/282
See application file for complete search history.

(56) References Cited

U.S. PATENT DOCUMENTS

| | | | | |
|---|---|---|---|---|
| 5,275,437 A * | 1/1994 | Modinger et al. | ........... | 280/806 |
| 5,641,131 A * | 6/1997 | Schmid et al. | ............... | 242/374 |
| 5,699,976 A * | 12/1997 | Hori | ............................ | 242/374 |
| 5,782,423 A * | 7/1998 | Miller et al. | ................. | 242/374 |
| 6,299,090 B1 * | 10/2001 | Specht et al. | ................ | 242/374 |
| 6,450,435 B2 * | 9/2002 | Junker et al. | ................. | 242/374 |
| 6,932,324 B2 * | 8/2005 | Biller et al. | .................. | 254/230 |
| 6,979,024 B2 * | 12/2005 | Cunningham et al. | ........ | 280/806 |
| 6,994,288 B2 * | 2/2006 | Wier | ........................... | 242/374 |
| 7,080,799 B2 * | 7/2006 | Singer et al. | ................. | 242/374 |
| 7,584,999 B2 * | 9/2009 | Schmid | ...................... | 280/806 |

FOREIGN PATENT DOCUMENTS

| | | |
|---|---|---|
| DE | 4415103 A1 | 4/1995 |
| EP | 0629531 B1 | 4/1997 |
| EP | 0992406 A2 | 4/2000 |
| EP | 0980799 B1 | 9/2004 |

* cited by examiner

Primary Examiner—Paul N Dickson
Assistant Examiner—Timothy D Wilhelm
(74) Attorney, Agent, or Firm—Lonnie Drayer; Markell Seitzman

(57) ABSTRACT

A device for tightening a seat belt has a piston (2) drivable linearly in a piston guide (1) by the gas pressure of a propellant gas. A gearing (3) is also caused to move by the piston (2), the gearing serving the transmission of the piston movement to a pinion (4). The pinion (4) is connected to, or configured to be connected to, a belt spool of a seat belt retractor (13) in a manner whereby rotation of the pinion causes rotation of the belt spool. The gearing (3) on associated with the piston (2) is mounted displaceable transversely to the piston's direction of movement and meshes with the pinion (4) as a result of gas pressure in an expandable bladder (24).

22 Claims, 4 Drawing Sheets

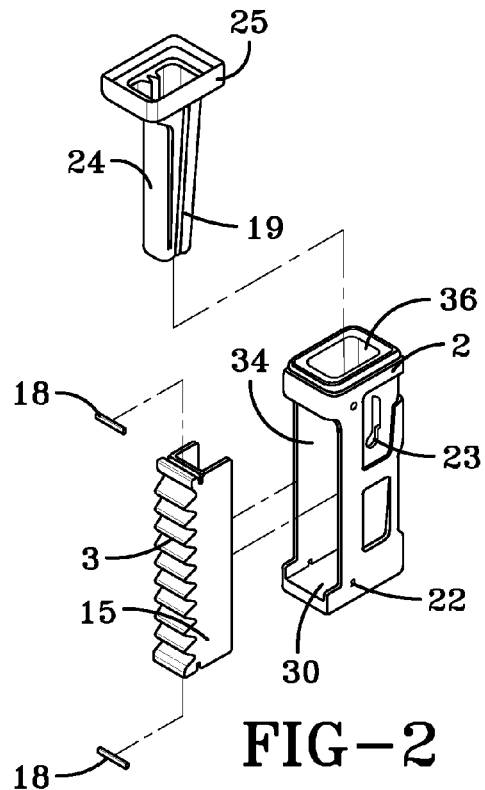
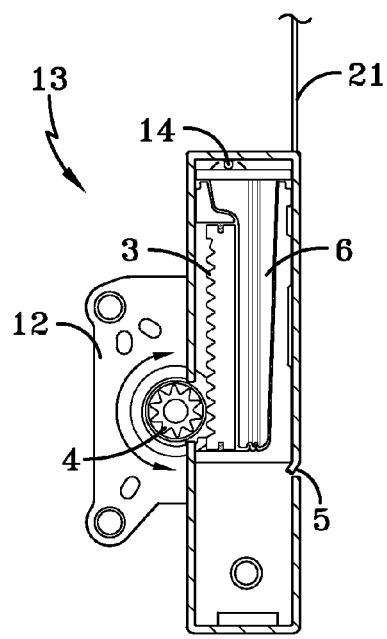
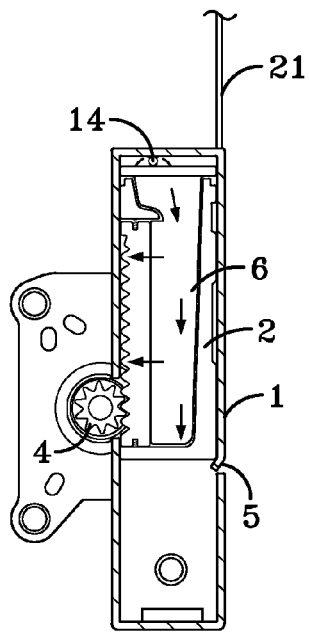
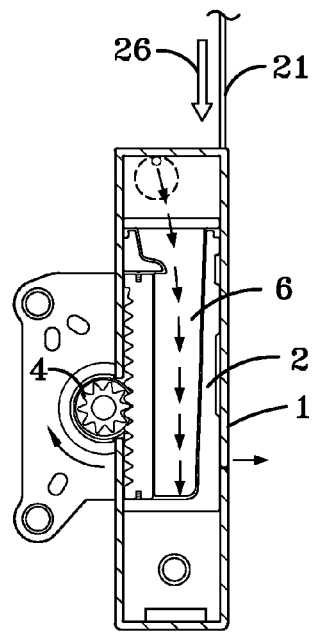
FIG-2
FIG-3A
FIG-3B
FIG-3C

DEVICE FOR TIGHTENING A SEAT BELT

FIELD OF THE INVENTION

The present invention relates to a device for tightening a seat belt in a vehicle.

BACKGROUND OF THE INVENTION

EP 0 629 531 B1 teaches a seat belt tightening device comprising a piston drivable by gas pressure linearly in a piston guide during a seat belt tightening operation. The gas driven piston causes a movement of an interlocking mechanism, namely a toothed rack, that moves only longitudinally with the piston to mesh with a pinion. The pinion is connected to a belt spool of a seat belt retractor in a drivable manner or can be connected with the belt spool by a clutch. EP 0 980 799 B1 and EP 0 992 406 A2 teach devices of this type for tightening a seat belt in a vehicle.

In the known seat belt tightening devices the meshing of the gearing on the piston and the gearing on the pinion takes place substantially in a tangential direction, resulting in a significant stress on the gearing. In the present invention simplified transmissions of movement and forces are achieved between the driven piston and the pinion associated with the belt spool of the seat belt retractor.

According to the invention the gearing associated with the piston is displaceable in a direction transverse to the direction of movement of the driven piston. The gearing associated with the piston is a toothed rack on which gearing in the form of teeth is provided, wherein as a result of the gas pressure inside an expandable bladder fixed to the piston the gearing associated with the piston meshes with the gearing of the pinion in a non-tangential manner.

BRIEF DESCRIPTION OF THE DRAWINGS

FIG. 2 is an exploded perspective view of the exemplary device.

FIGS. 3A to 3G are a series of cross section views showing the operation of the exemplary device.

Figure 1:
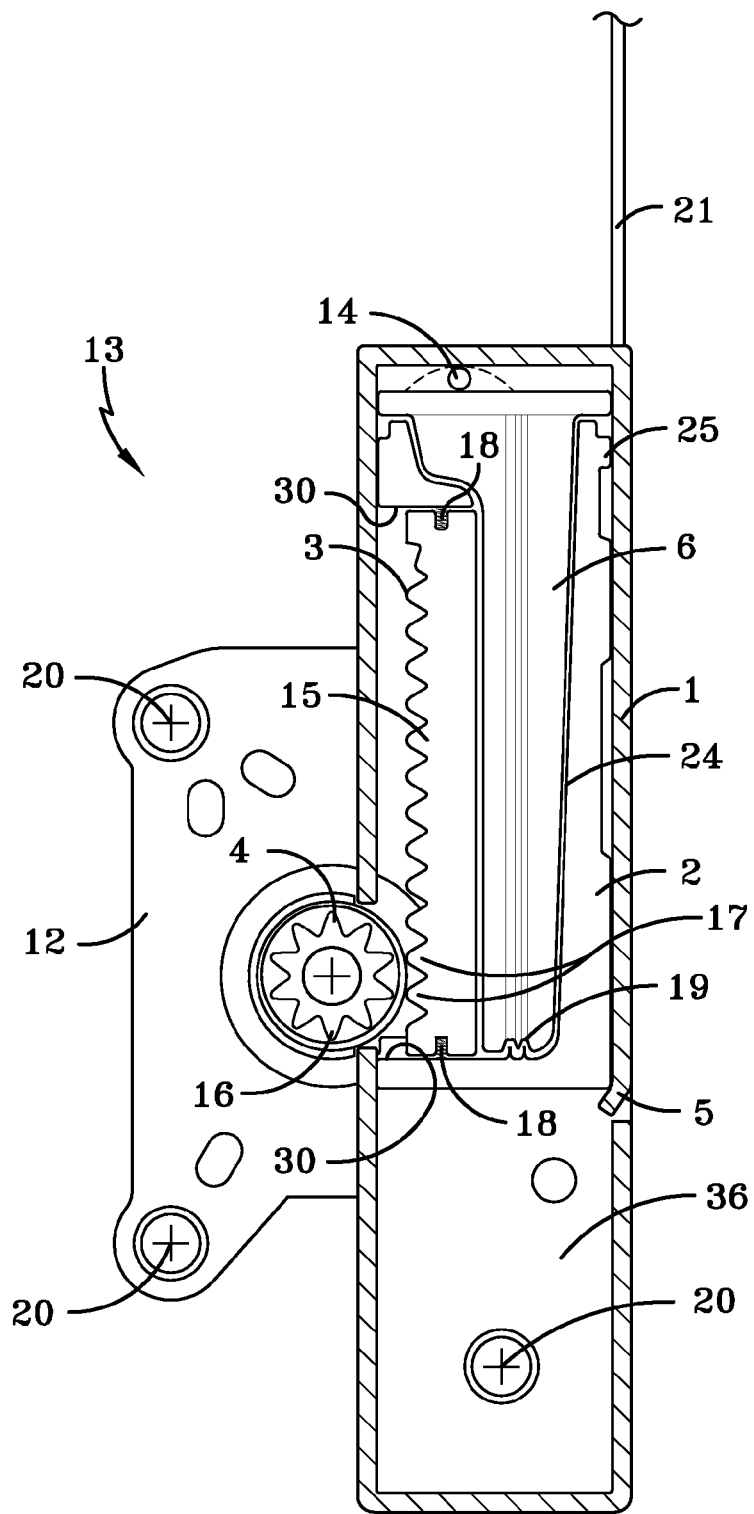
FIG. 1 is a side elevation cross-section of an exemplary device for tightening a seat belt according to the present invention.

The example of a device for tightening a seat belt 21 in a vehicle shown in the figures comprises a piston guide 1 in which a piston 2 can be driven and displaced by gas pressure. The piston 2 is moved linearly in the piston guide. A cross-section of a piston guide channel 36 formed in the piston guide 1 is adjusted to complement the cross-section of the piston 2. In the illustrated example, the piston guide channel 36 has a substantially rectangular cross-section, as shown in FIG. 2. An elliptic or oval cross-section is also conceivable. Preferably the cross-sections of the piston 2 and for the piston guide channel 36 in the piston guide 1 are selected to differ from a circular shape to prevent rotation of the piston relative to the piston guide channel.

A gearing 3 is integrally formed on a toothed rack 15 that is supported by the piston 2 at least in part via an expandable bladder 24. The gearing 3 comprises a series of teeth 17 that are integral with toothed rack 15. The toothed rack 15 can be a solid toothed rack. The toothed rack may have a U-shaped cross-section, as shown in FIG. 2. The toothed rack 15 with the gearing 3 is received in a complementary recess 34 of the piston 2. Upper and lower piston guide end surfaces 30, of which in FIG. 2 only the lower piston guide end surface is visible, provide guidance of the toothed rack 15 and the gearing 3 that is supported by the piston 2 at least in part via the expandable bladder 24. The piston guide end surfaces 30 extend transverse to the direction indicated by an arrow X in FIG. 3D in which the piston 2 is driven. The piston guide end surfaces 30 can be inclined slightly slanted, wherein the slant is inclined downward from the right to the left in FIG. 1. The angle of inclination in relation to the horizontal line is a small acute angle of less than 10°. As a result, a movement of the gearing 3 on a toothed rack 15 that is supported by the piston 2 at least in part via the expandable bladder 24 in a direction away from the piston that is less than 10° from being perpendicular to the direction X in which the piston is driven is achieved, resulting in less stress to the gearing 3 of the toothed rack 15 and the gearing 16 of the pinion 4, when they are meshed together.

The pinion 4 is preferably connected to a belt spool of a seat belt retractor 13 such that the pinion cannot rotate independently of the belt spool. As will be explained below, it is not essential to provide a clutch and/or a freewheel between the pinion 4 and the belt spool since this function is made redundant by the transversely displaceable gearing 3 because the clutch function is assumed by the gearing 3 integrally formed on a toothed rack 15 that is supported by the piston 2 at least in part via an expandable bladder 24 such that the gearing 3 is transversely displaceable with respect to the direction X in which the piston is driven during a seat belt tightening operation. Simply put rotation of the pinion causes rotation of the belt spool without a clutch being in the transmission path between the pinion and the belt spool.

In FIGS. 1 and 3A an idle position or initial position of the piston 2 in the piston guide 1 is shown. In this position, the pinion 4 and the belt spool connected thereto, onto which the seat belt 21 is wound in the seat belt retractor 13, can be rotated freely in relation to the gearing 3 integrally formed on a toothed rack 15 that is supported by the piston 2 at least in part via an expandable bladder 24. As FIGS. 1 and 3A show, an idle position or initial position when the piston 2 is stationary the gearing 3 of the toothed rack 15 is disposed at a distance from the gearing 16 of the pinion 4 along a line extending radially from an axis of rotation of the pinion.

Figure 5:
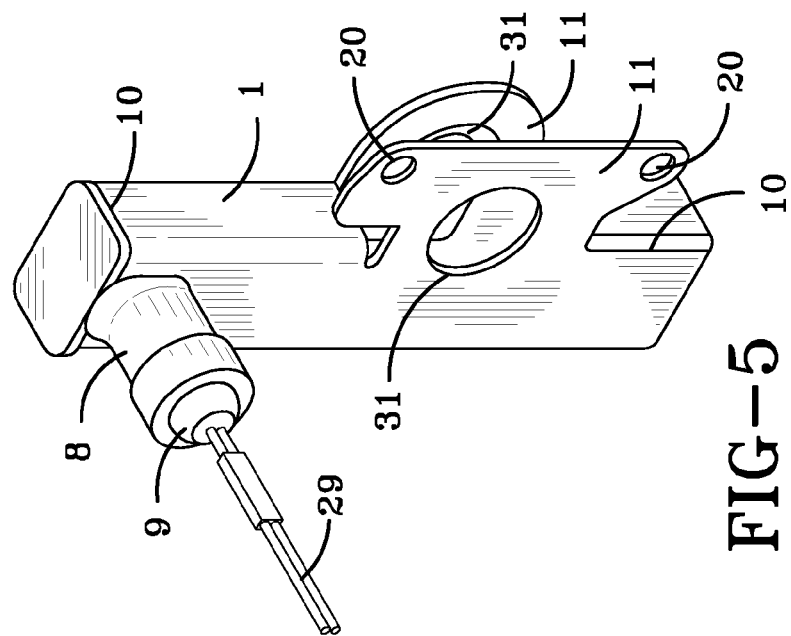
FIG. 5 is a perspective view of a piston guide produced using the metal part shown in FIG. 4.

As shown in FIG. 5 an installation element is provided on the piston guide 1 to which a gas generator 9 for supplying the propellant gas can be attached. The gas generator 9, is preferably fastened to a pre-assembled unit comprising the piston guide 1, the piston 2, and the gearing 3.

The piston is held in a stationary position prior to a drive movement, for example with the help of a retaining device 5, until the meshing of the gearings 3,16 on the piston 2 and pinion 4 has taken place. Through the retaining device 5, it is possible that the piston only starts the drive movement when a defined gas pressure level has been reached inside the inflatable bladder 24, after the meshing of the gearings 3,16 on the piston 2 and pinion 4 has taken place. In this way, it is guaranteed that the meshing occurs substantially in the radial direction with respect to the pinion 4. The material stress to the rack and pinion, particularly in the gearings, is considerably less than in the case of tangential meshing. It can be precise radial meshing, however meshing that occurs at a relatively small, acute angle (less than 10°) in relation to the exact radial direction is also conceivable, wherein the angular incline is in the piston drive direction.

During the driven movement of the piston 2 the meshing of the gearing 3 of the toothed rack with the gearing 16 of the pinion 4 is maintained by the gas pressure inside the expandable bladder 24. To this end, the piston preferably comprises a hollow space 6 lined by the expandable bladder 24, which acts as a pressure chamber in which the gas pressure required for driving the piston is present. As explained above, this gas pressure maintains the meshing of the gearings 3, 4 when the piston moves linearly in the piston guide.

Figure 3D:
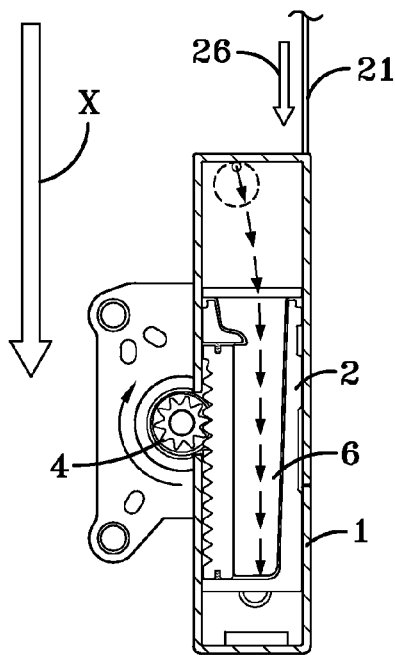
Figure 3E:
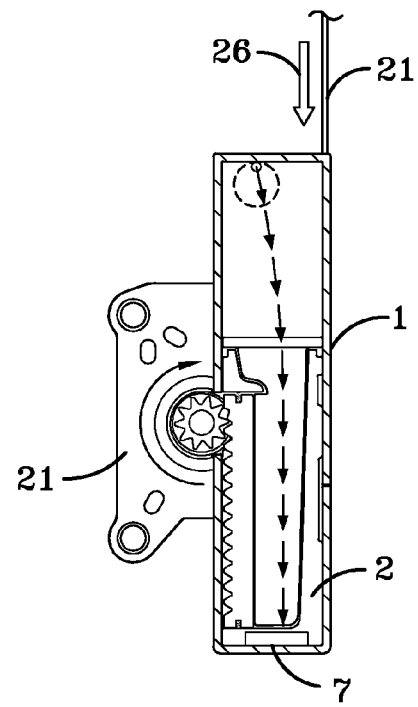

If during a crash, or other excess acceleration acting on the vehicle, a gas generator 9 attached to the piston guide 1, as shown in FIG. 5, is activated by an activation signal transmitted via electrical cables 29, propellant located in the gas generator is burned to generate gas that is supplied to the expandable bladder 24 lining the hollow space 6 inside the piston guide 1. The propellant gas is introduced via an inflow opening 14 into the upper part of the piston guide channel 36 of the piston guide 1. At the beginning of the propellant gas introduction (FIG. 3B), gas pressure increases in the expandable bladder 24 in the piston 2, wherein the gas pressure, for example due to static friction, is not yet high enough to displace the piston 2 from the idle position. In addition, with the help of a retaining device 5 the piston 2 can be held in the idle position as the propellant gas begins to flow in as shown in FIG. 3B. The retaining device 5 shown in a tab bent into piston guide into the path of the piston. As a result of the gas pressure increasing in the expandable bladder 24, the toothed rack 15 having the gearing 3 is displaced away from the piston through the recess 34 transversely to the longitudinal extension of the piston guide channel 36 of the piston guide 1 in a direction towards the gearing 16 of the pinion 4. From the idle position shown in FIG. 3A, the gearing 3 is moved into an engaging position, shown in FIG. 3B, wherein the gearing 3 of the toothed rack 15 and the gearing 16 of the pinion 4 mesh, while the piston remains in the idle position without moving along the of the piston guide channel 36 of the piston guide 1. As more propellant gas flows into the expandable bladder 24, the gas pressure in the expandable bladder and in the upper part of the piston guide channel 36 of the piston guide 1 increases. When a defined gas pressure is exceeded, the retaining device 5 fails and the piston 2 is displaced along the piston guide channel 36 in the piston guide 1 in the direction indicated by an arrow X in FIG. 3D. This movement is shown in FIGS. 3C and 3D. The seat belt 21 is wound onto the belt spool of the seat belt retractor 13 in the belt retraction direction 26 causing the belt webbing fastened around a vehicle passenger to be tightened. This drive movement of the piston 2 is performed until a final position of the piston shown in FIG. 3E is reached, in which the piston is held in place by an arresting member 7 disposed at the end of the piston guide channel 36. The arresting member 7 may be provided in another suitable location of the piston guide 1.

The hollow space 6 has as a lining an expandable bladder 24 comprising a gas-tight material, or a textile or other sheet material having a specified gas permeability, for example an airbag fabric. The expandable bladder 24 is configured such that the gas pressure required in the expandable bladder meshing of the gearing 3, 4 and the linear movement of the piston 2 in the piston guide 1 is maintained long enough to tighten the seat belt 21. For this purpose, the expandable bladder 24, and effectively the hollow space 6, can be transmit the gas pressure at least in the direction of movement of the toothed rack 15, which is to say in the figures horizontally to the left. The expandable bladder 24 may be one piece having a peripheral seal 25 at the upper edge, which encompasses the top opening of the hollow space 6. The expansion of the expandable bladder 24 may be facilitated by providing the expandable bladder with expansion pleats 19. The part of the expandable bladder 24 supporting a side of the toothed rack 15 that is opposite from the gearing 3 is displaced toward the pinion 4 away from the piston. This movement is casuedut by the gas pressure in the expandable bladder 24. As explained above, the toothed rack 15 having the gearing 3 is displaced in a substantially radial direction toward the pinion 4, and the gearing 3 meshes with the pinion gearing 16. Due to this meshing, the piston drive movement, which is explained above and progresses from the configuration shown in FIG. 3B to the configuration shown according to FIG. 3E, is transmitted to the pinion 4 and hence to the belt spool of the seat belt retractor 13.

When a seat belt tightening operation is completed the gas pressure in the expandable bladder 24 is decreased, for example via a valve or through a textile or other sheet material having a specified gas permeability comprising the expandable bladder. Once a defined reduced gas pressure is reached in the expandable bladder 24, the gearing 3 disengages from the pinion 4 and the toothed rack 15 is returned to the initial position by a restoring force which can be produced by two return springs 18, which act at the upper end and the lower end of the toothed rack. This state is shown in FIG. 3G. Instead of the two return springs 18, which are supported on the piston by the support features 22, only one return spring supported on the piston 2 may be provided. An overpressure opening 23 is provided on the piston 2, which is opened to reduce gas pressure if excess gas pressure develops in the hollow space 6.

After the tightening stroke the gearing 3 is disengaged from the pinion gearing 16 due to the restoring force of the return springs 18, which is shown shown in FIG. 3G, the belt spool can rotate unimpaired by the piston 2 in the belt webbing protraction direction 27. Thus a forward movement of the vehicle occupant secured by the seat belt is possible, but the forward movement is controlled by a load limiter. Load limiters, for example, torsion bars or electric-motor drives acting on belt spools, are well known.

Since, as explained above, the toothed rack 15 is initially movable towards the pinion independent of the linear movement of the piston, the movement of the gearing 3 provided thereon has the effect of a clutch when the force is transmitted from the piston to the belt spool, and a clutch is not required between the pinion 4 and the belt spool. The pinion 4 can therefore be connected to the belt spool of the seat belt retractor 13 such that the pinion cannot rotate independent of the belt spool.

Figure 3F:
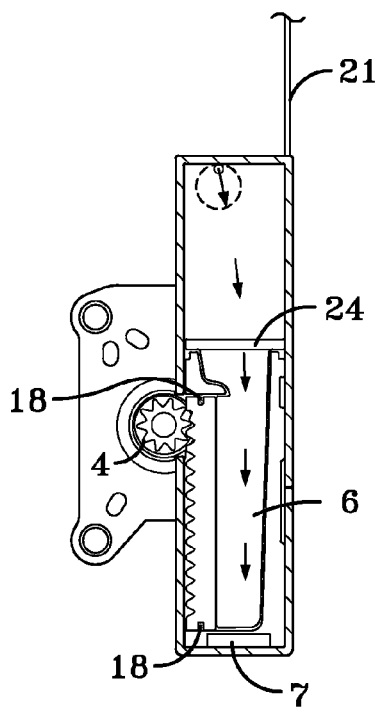
Figure 3G:
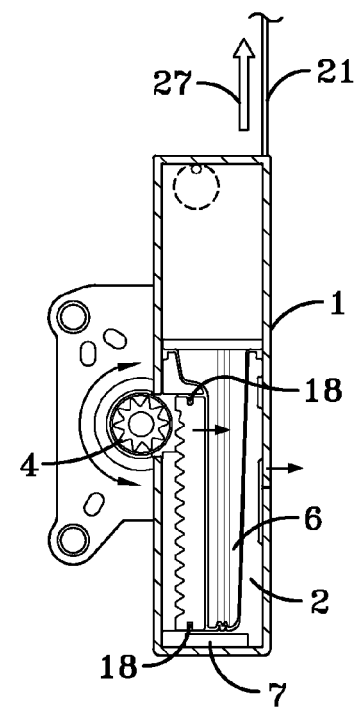

To guarantee the reduction of gas pressure in the expandable bladder 24 after the tightening stroke of the piston during the operational state shown in FIG. 3F, a pressure relief valve may be provided, but is not shown in detail. The expandable bladder 24 can be made of a textile or other sheet material having a specified gas permeability, such as an airbag fabric, to ensure the higher gas pressure continues in the hollow space 6 for only a defined time.

Figure 4:
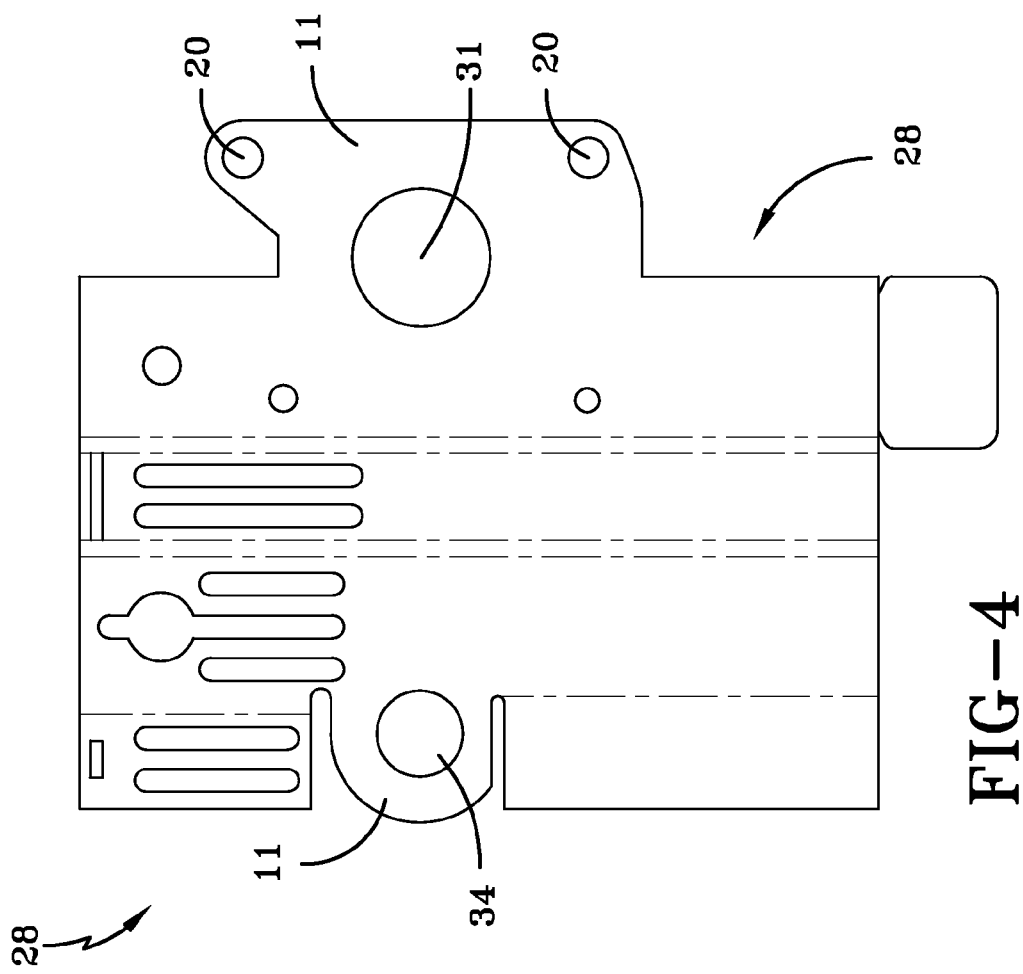
FIG. 4 shows a sheet of metal that can be folded to produce a piston guide used in the exemplary device.

FIG. 5 is a perspective view of a preferred embodiment of the piston guide 1. The piston guide defines the piston guide channel 36 along which the piston 1 is driven linearly by gas pressure. The piston guide 1 may be formed from a punched metal part shown in FIG. 4 by folding.

A piston guide 1 according to the invention can be made of a punched metal part, which is folded into the final shape of the piston guide. At the one or more sites where the folded metal parts rest against one another a weld is provided, preferably by laser welding. The shape of the initial punched metal part is such that after folding into the shape required for the piston guide fastening tabs remain. Preferably fastening points for fastening the device for tightening a seat belt to the frame of the seat belt retractor 13 are provided on the fastening tabs. The fastening points can be adjusted to the respective installation requirements. Furthermore, recesses may be provided for the mounting of the pinion 4 to the fastening tabs.

Defined structures are integrally formed on the metal part 28. The structures here are fastening tabs 11 having holes, which form fastening points 20 for the subsequent fastening of the piston guide 1 to the seat belt retractor frame 12, for example by screw or rivet connections or other fastening means. Circular passages 31 are formed in the metal part 28 in the region of the fastening tabs 11, the recesses serving to mount the pinion 4 in the region of the fastening tabs. The metal part 28 is folded into the box shape shown in FIG. 5 to form the piston guide 1. At the impact sites 10 the folded parts are welded, preferably by laser welding.

The piston guide 1 and the piston 2 disposed therein having the toothed rack 15 can be preassembled as a unit. On this unit a fastening point 8 is provided, to which the gas generator 9 generating the propellant gas can be fastened after the unit has been produced. Holes 20 can be disposed at desired locations on the tab 11 to satisfy a variety of installation requirements. The piston guide 1 can thus be fastened in arbitrary angular positions about the axis of rotation of the pinion on the seat belt retractor frame.

In all cases it is understood that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

The invention claimed is:

1. A device for tightening a seat belt comprising a piston drivable by gas pressure linearly in a piston guide, and a first gearing is supported by the piston and is also caused to move linearly by the piston, the first gearing used to transmit movement of the piston to a second gearing that is part of a pinion by meshing of the first and second gearings, the pinion being connected to or configured to be connected to a belt spool of a seat belt retractor in a manner whereby rotation of the pinion causes rotation of the belt spool, wherein gas pressure moves the first gearing in a direction away from the piston towards the second gearing to mesh the first gearing with the second gearing before the piston begins to move linearly in the piston guide.

2. The device for tightening a seat belt according to claim 1, wherein the first gearing is integrally formed on a toothed rack that is supported by the piston at least in part via an expandable bladder, and gas pressure in the expandable bladder moves the toothed rack in a direction away from the piston towards the second gearing before the piston begins to move linearly in the piston guide.

3. A device for tightening a seat belt comprising a piston drivable by gas pressure linearly in a piston guide, and a first gearing also caused to move linearly by the piston, the first gearing used to transmit movement of the piston to a second gearing that is part of a pinion by meshing of the first and second gearings, the pinion being connected to or configured to be connected to a belt spool of a seat belt retractor in a manner whereby rotation of the pinion causes rotation of the belt spool, the first gearing being integrally formed on a toothed rack that is supported by the piston at least in part via an expandable bladder, and the first gearing is meshed with the second gearing by gas pressure in the expandable bladder moving the toothed rack in a direction away from the piston before the piston begins to move linearly in the piston guide.

4. The device for tightening a seat belt according to claim 3, wherein the expandable bladder comprises a textile or other sheet material having a specified gas permeability to allow the bladder to vent gas after completion of a seat belt tightening operation.

5. The device for tightening a seat belt according to claim 3, wherein during a movement of the first gearing to mesh with the second gearing the piston is held in a stationary position by a retaining device.

6. The device for tightening a seat belt according to claim 3, wherein the first gearing is maintained in the meshed state with the second gearing by gas pressure inside the expandable bladder when the piston moves linearly in the piston guide.

7. The device for tightening a seat belt according to claim 3, wherein when the piston is stationary in an initial position before a seat belt tightening operation the first gearing is disposed at a distance from the second gearing along a line extending radially from an axis of rotation of the pinion.

8. The device for tightening a seat belt according to claim 3, wherein the first gearing is moved linearly by the piston when the piston moves linearly in the piston guide.

9. The device for tightening a seat belt according to claim 3, wherein rotation of the pinion causes rotation of the belt spool without a clutch being in the transmission path between the pinion and the belt spool.

10. The device for tightening a seat belt according to claim 3, wherein the first gearing is disengaged from the second gearing after completion of a seat belt tightening operation.

11. The device for tightening a seat belt according to claim 3, wherein after completion of a seat belt tightening operation the gas pressure in the expandable bladder is reduced.

12. The device for tightening a seat belt according to claim 3, wherein after completion of a seat belt tightening operation the piston is maintained in a final position by an arresting member.

13. A device for tightening a seat belt, comprising a piston drivable by gas pressure linearly in a piston guide, and a toothed rack that is supported by the piston at least in part via an expandable bladder such that the toothed rack is caused to move linearly by the piston, a first gearing being integrally formed on the toothed rack, the first gearing used to transmit movement of the piston to a second gearing that is part of a pinion by meshing of the first and second gearings, the pinion being connected to a belt spool of a seat belt retractor in a manner whereby rotation of the pinion causes rotation of the belt spool without a clutch being in the transmission path between the pinion and the belt spool, and the first gearing is meshed with the second gearing by gas pressure in the expandable bladder moving the toothed rack in a direction away from the piston towards the pinion while the piston is stationary before the piston begins to move linearly in the piston guide.

14. The device for tightening a seat belt according to claim 13, wherein expansion of the expandable bladder is facilitated by providing the expandable bladder with expansion pleats.

15. The device for tightening a seat belt according to claim 13, wherein the first gearing is maintained in the meshed state with the second gearing by gas pressure inside the expandable bladder when the piston moves linearly in the piston guide.

16. The device for tightening a seat belt according to claim 13, after completion of a seat belt tightening operation the gas pressure in the expandable bladder is reduced causing the first gearing to be disengaged from the second gearing.

17. A device for tightening a seat belt, comprising a gas generator for providing gas to a piston guide, a piston drivable by gas pressure linearly in the piston guide, and a toothed rack that is supported by the piston at least in part via an expandable bladder that receives gas pressure via the piston guide such that the toothed rack is caused to move linearly by the piston, a first gearing being integrally formed on the toothed rack, the first gearing used to transmit movement of the piston to a second gearing that is part of a pinion by meshing of the first and second gearings, the pinion being connected to a belt spool of a seat belt retractor in a manner whereby rotation of the pinion causes rotation of the belt spool without a clutch being in the transmission path between the pinion and the belt spool, and the first gearing is meshed with the second gearing by gas pressure in the expandable bladder moving the toothed rack in a direction away from the piston towards the pinion while the piston is stationary before the piston begins to move linearly in the piston guide, the first gearing is maintained in the meshed state with the second gearing by gas pressure inside the expandable bladder when the piston moves linearly in the piston guide, and the expandable bladder comprising a textile or other sheet material having a specified gas permeability to allow the bladder to vent gas after completion of a seat belt tightening operation.

18. The device for tightening a seat belt according to claim 17, wherein expansion of the expandable bladder is facilitated by providing the expandable bladder with expansion pleats.

19. The device for tightening a seat belt according to claim 17, after completion of a seat belt tightening operation the gas pressure in the expandable bladder is reduced causing the first gearing to be disengaged from the second gearing.

20. The device for tightening a seat belt according to claim 17, wherein when the piston is stationary in an initial position before a seat belt tightening operation the first gearing is disposed at a distance from the second gearing along a line extending radially from an axis of rotation of the pinion.

21. The device for tightening a seat belt according to claim 17, wherein during a movement of the first gearing to mesh with the second gearing the piston is held in a stationary position by a retaining device.

22. The device for tightening a seat belt according to claim 17, wherein after completion of a seat belt tightening operation the piston is maintained in a final position by an arresting member.

* * * * *